(12) United States Patent
Su (10) Patent No.: US 8,958,517 B2
(45) Date of Patent: Feb. 17, 2015

(54) CLOCK PHASE ADJUSTMENT FOR A LOW-LATENCY FIFO

(75) Inventor: Jianghui Su, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 456 days.

(21) Appl. No.: 13/341,119

(22) Filed: Dec. 30, 2011

(65) Prior Publication Data

US 2013/0170591 A1    Jul. 4, 2013

(51) Int. Cl.
H04L 7/00    (2006.01)

(52) U.S. Cl.
USPC ............................................ 375/372; 375/371

(58) Field of Classification Search
USPC .............................. 375/372, 359, 371; 327/160
See application file for complete search history.

(56) References Cited

U.S. PATENT DOCUMENTS

| | | | |
|---|---|---|---|
| 6,182,237 B1 | 1/2001 | Bronson et al. | |
| 6,240,523 B1 | 5/2001 | Rogers | |
| 6,900,674 B2 | 5/2005 | Sutera et al. | |
| 7,469,356 B2 | 12/2008 | Wickeraad | |
| 8,572,532 B1 * | 10/2013 | Singh et al. | 716/108 |
| 2002/0199124 A1 | 12/2002 | Adkisson | |
| 2006/0190757 A1 | 8/2006 | Wickeraad | |
| 2009/0184735 A1 | 7/2009 | Wicki et al. | |
| 2009/0240969 A1 * | 9/2009 | Chiu et al. | 713/401 |
| 2009/0267666 A1 * | 10/2009 | Marutani | 327/160 |
| 2010/0199244 A1 | 8/2010 | Kwok et al. | |

OTHER PUBLICATIONS

J.T. Yantchev et al (Low-latency asynchronous FIFO buffers, ASYNC '95 Proceedings of the 2nd Working Conference on Asynchronous Design Methodologies p. 24, IEEE Computer Society Washington, DC USA, 1995).*
Landoll, David, "Mitigating the Dangers of Multi-Clock Designs", National Software and Complex Electronic Hardware Conference, Aug. 20-21, 2008, Denver.
Nyathi, Jabulani, "Multiple Clock Domain Synchronization for Network on Chip Architectures", http://www.eecs.wsu.edu/ ee587/ HomeWork/Nyathi_NoC.pdf.
Scott F. Smith, "Low-latency Multiple Clock Domain Interfacing Without Alteration of Local Clocks", IEEE 15th Biennial University/Government/Industry Microelectronics Symposium (UGIM '03).

* cited by examiner

*Primary Examiner* — Shuwang Liu
*Assistant Examiner* — Helene Tayong
(74) *Attorney, Agent, or Firm* — Park, Vaughan, Fleming & Dowler LLP (57) ABSTRACT

In a clock-adjustment circuit, a phase-detection circuit receives a first clock associated with a first clock domain and a second clock associated with a second clock domain, and determines a phase relationship between the first clock and the second clock. Then, the phase-adjustment circuit in the clock-adjustment circuit adjusts a phase of the first clock relative to the second clock if the determined phase relationship is associated with a metastable range of a first-in first-out (FIFO) buffer that transfers data from the first clock domain to the second clock domain, thereby reducing latency associated with the FIFO buffer.

20 Claims, 6 Drawing Sheets

FIG. 6

CLOCK PHASE ADJUSTMENT FOR A LOW-LATENCY FIFO

BACKGROUND

1. Field

The present disclosure generally relates to clocking circuits. More specifically, the present disclosure relates to a clock-adjustment circuit that adjusts the relative phase of a clock at a clock-domain boundary to reduce the latency of a first-in first-out (FIFO) buffer.

2. Related Art

Serializer/deserializer (SerDes) circuits are often used as input/output (I/O) circuits. In such applications, there are typically two clocks: the receiver recovered clock (RRCLK) and a core logic clock (CCLK).

CCLK is typically generated using a reference that has a fixed phase and a fixed frequency. RRCLK is usually recovered from received data using a clock-data recovery (CDR) circuit, and has a phase and a frequency that follow the sampled data. However, there may be a random phase contribution to the phase of the received data (for example, because of clock latency, phase jitter and/or propagation delays in signal lines). As a consequence, for the same received data, the phase of RRCLK may be random relative to that of the reference clock that was used to transmit the data. If the reference clock is shared with the core logic, this randomness can cause RRCLK and CCLK to have a different and random phase, even though they have the same frequency.

Moreover, when data is passed from the RRCLK clock domain to the CCLK clock domain, a first-in first-out (FIFO) buffer is typically used. However, the randomness of the relative phases of RRCLK and CCLK can significantly increase the latency cost in the datapath, which can degrade the performance of the entire design.

Hence, what is needed is a clock-adjustment circuit for use in conjunction with clock-domain boundaries to convert the random phase relationship between the RRCLK and CCLK into fixed/targeted relationship to enable using low latency FIFO design for determined read and write clock.

SUMMARY

One embodiment of the present disclosure provides a clock-adjustment circuit. This clock-adjustment circuit includes a phase-detection circuit and a phase-adjustment circuit. The phase-detection circuit receives a first clock associated with a first clock domain and a second clock associated with a second clock domain, and determines a phase relationship between the first clock and the second clock. Then, the phase-adjustment circuit adjusts a phase of the first clock relative to the second clock to a determined phase relationship. The fixed phase relationship is to avoid the metastable range of a first-in first-out (FIFO) buffer that transfers data from the first clock domain to the second clock domain. This will help to eliminate the guard band stage in FIFO buffer and will result in reducing latency associated with the FIFO buffer.

Note that the first clock may be recovered from received data, for example, by a clock-data recovery (CDR) circuit that is associated with a serializer/deserializer (SerDes) circuit. Moreover, the second clock may be a core clock associated with logic or a processor. Furthermore, the first clock and the second clock may have the same fundamental frequency.

The clock-adjustment circuit may convert a random phase of the first clock into a deterministic phase relative to the second clock. This deterministic phase may be less than one clock period. In some embodiments, adjusting the phase of the first clock may involve adding a delay.

Furthermore, the phase-detection circuit may include a divide-by-2 circuit that outputs a third clock having a frequency equal to that of the second clock divided by 2. This clock is used as a data signal. Moreover, the phase-detection circuit may include: a first flip-flop, gated by a first version of the first clock having a first phase, which samples the third clock and outputs one of a first pair of phase signals; and a second flip-flop, gated by a second version of the first clock having a second phase, which samples the third clock and outputs another of the first pair of phase signals. Note that a phase difference between the first version of the first clock and the second version of the first clock may correspond to the metastable range of a 2-stage FIFO design.

Additionally, the phase-detection circuit may include: a third flip-flop coupled to the first flip-flop and gated by the first clock, where the third flip-flop samples the one of the first pair of phase signals and outputs one of a second pair of phase signals; and a fourth flip-flop coupled to the second flip-flop and gated by the first clock, where the fourth flip-flop samples the other of the first pair of phase signals and outputs another of the second pair of phase signals. In some embodiments, the determined phase relationship occurs when the one of the second pair of phase signals is opposite to the other of the second pair of phase signals.

Another embodiment provides a system that includes the clock-adjustment circuit. This system may be implemented on one or more integrated circuits.

Another embodiment provides a method for adjusting the phase of the first clock relative to the second clock. During this method, the phase-detection circuit receives the first clock associated with the first clock domain and the second clock associated with the second clock domain. Then, the phase-detection circuit determines a phase relationship between the first clock and the second clock. Next, a phase-adjustment circuit adjusts the phase of the first clock relative to the second clock to the determined phase relationship, which is associated with the metastable range of the FIFO buffer that transfers data from the first clock domain to the second clock domain. This will help to eliminate the guard band stage in FIFO buffer and will result in reducing latency associated with the FIFO buffer.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a clock-adjustment circuit, a system that includes the clock-adjustment circuit, and a method for adjusting a phase of a first clock relative to a second clock are described. In the clock-adjustment circuit, a phase-detection circuit receives a first clock associated with a first clock domain and a second clock associated with a second clock domain, and determines a phase relationship between the first clock and the second clock. Then, the phase-adjustment circuit in the clock-adjustment circuit adjusts a phase of the first clock relative to the second clock to the determined phase relationship that is associated with a metastable range of a first-in first-out (FIFO) buffer that transfers data from the first clock domain to the second clock domain.

By adjusting the phase of the first clock based on the determined phase relationship, the clock-adjustment circuit may convert a random phase of the first clock into a deterministic phase relative to the second clock. In this way, the first clock can avoid the metastable range, which can reduce latency associated with the FIFO buffer and improve performance of the system.

Figure 1:
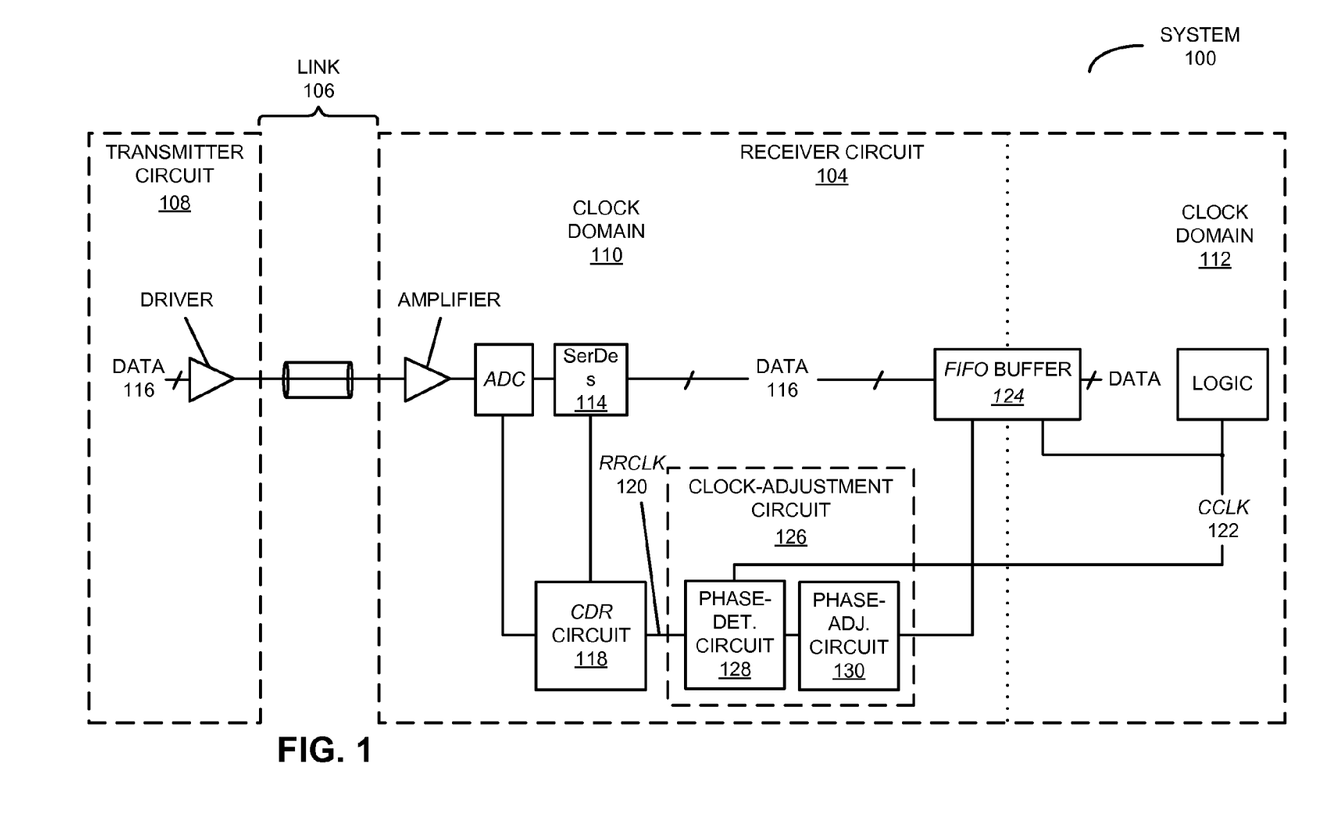
FIG. 1 is a block diagram illustrating a system in accordance with an embodiment of the present disclosure.

We now describe the system and the clock-adjustment circuit. FIG. 1 presents a block diagram illustrating a system 100, which includes a receiver 104 having clock domains 110 and 112. Clock domain 110 is associated with a serializer/deserializer (SerDes) circuit 114 that receives data 116 on a link 106 from a transmitter 108. Moreover, a clock-data recovery (CDR) circuit 118 in clock domain 110 recovers receiver recovered clock (RRCLK) 120. In addition, clock domain 112 is associated with logic or a processor, which use core logic clock (CCLK) 122.

In system 100, data 116 is transferred from clock domain 110 to clock domain 112 using FIFO buffer 124. As discussed previously, while RRCLK 120 and CCLK 122 may have the same fundamental frequency, their phase may be random, which can increase the latency of FIFO buffer 124 and can adversely impact the performance of system 100.

This problem may be addressed by clock-adjustment circuit 126. This clock-adjustment circuit includes a phase-detection circuit 128 and a phase-adjustment circuit 130. Phase-detection circuit 128 receives RRCLK 120 and CCLK 122, and determines a phase relationship between RRCLK 120 and CCLK 122. Then, phase-adjustment circuit 130 adjusts a phase of RRCLK 120 relative to CCLK 122 if the determined phase relationship is associated with a metastable range of FIFO buffer 124, thereby reducing latency associated with FIFO buffer 124.

For example, clock-adjustment circuit 126 may convert a random phase of RRCLK 120 into a deterministic phase relative to CCLK 122, thereby eliminating random variation with respect to the datapath latency or the data eye pattern. This deterministic phase may be predictable within a certain range (such as the metastable range). Moreover, the deterministic phase may be less than one clock period or, alternatively, one data period (which is also referred to as a 'unit interval'). In some embodiments, adjusting the phase of RRCLK 120 may involve adding a delay.

Figure 2:
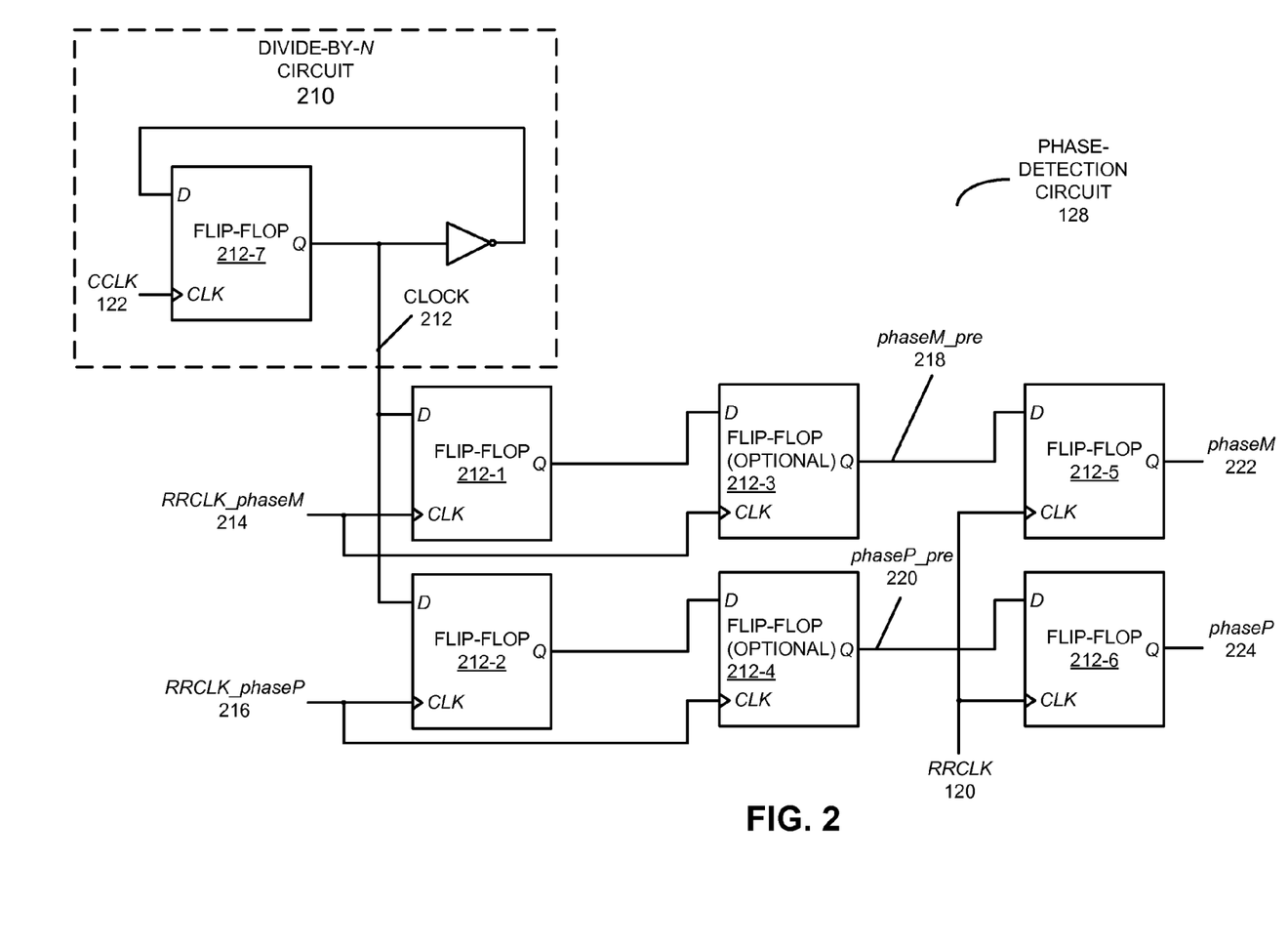
FIG. 2 is a block diagram illustrating a phase-detection circuit in the system of FIG. 1 in accordance with an embodiment of the present disclosure.

As shown in FIG. 2, phase-detection circuit 128 may include a divide-by-N circuit 210 that uses a flip-flop 212-7 to output clock 212 having a frequency equal to that of CCLK 122 divided by 2 (as discussed below, this clock is used as a data signal). Moreover, phase-detection circuit 128 may include: a flip-flop 212-1, that is gated by a first version of RRCLK 120 having a first phase (RRCLK_phaseM 214), which samples clock 212 and outputs one of a first pair of phase signals (phaseM_pre 218); and a flip-flop 212-2, gated by a second version of RRCLK 120 having a second phase (RRCLK_phaseP 216), which samples clock 212 and outputs another of the first pair of phase signals (phaseP_pre 220). Note that a phase difference between RRCLK_phaseM 214 and RRCLK_phaseP 216 may correspond to the metastable range.

Figure 3:
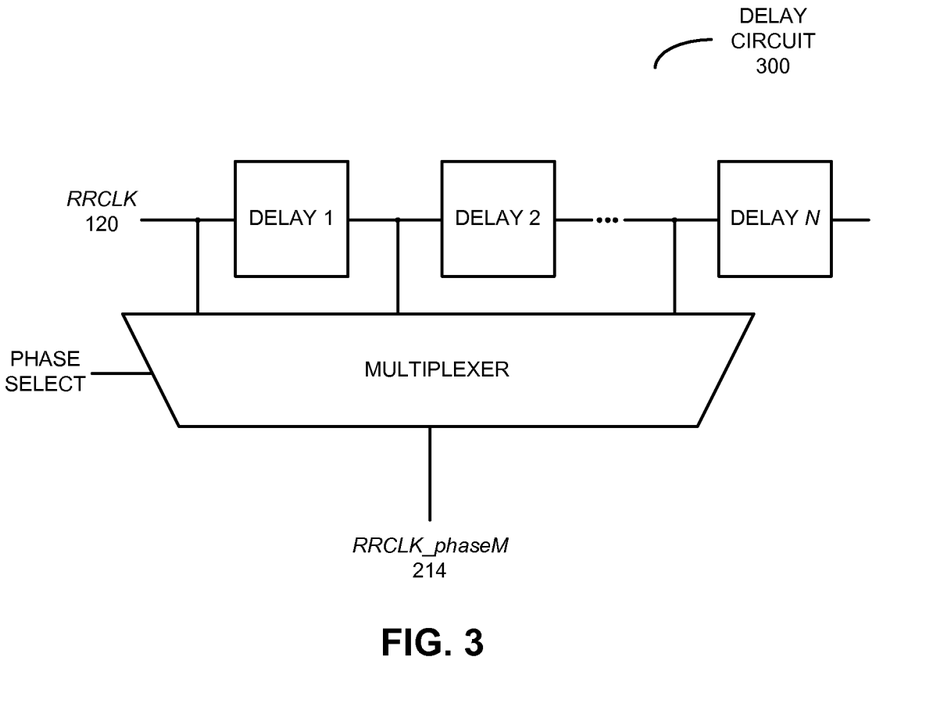
FIG. 3 is a block diagram illustrating a delay circuit in the system of FIG. 1 in accordance with an embodiment of the present disclosure.
Figure 4:
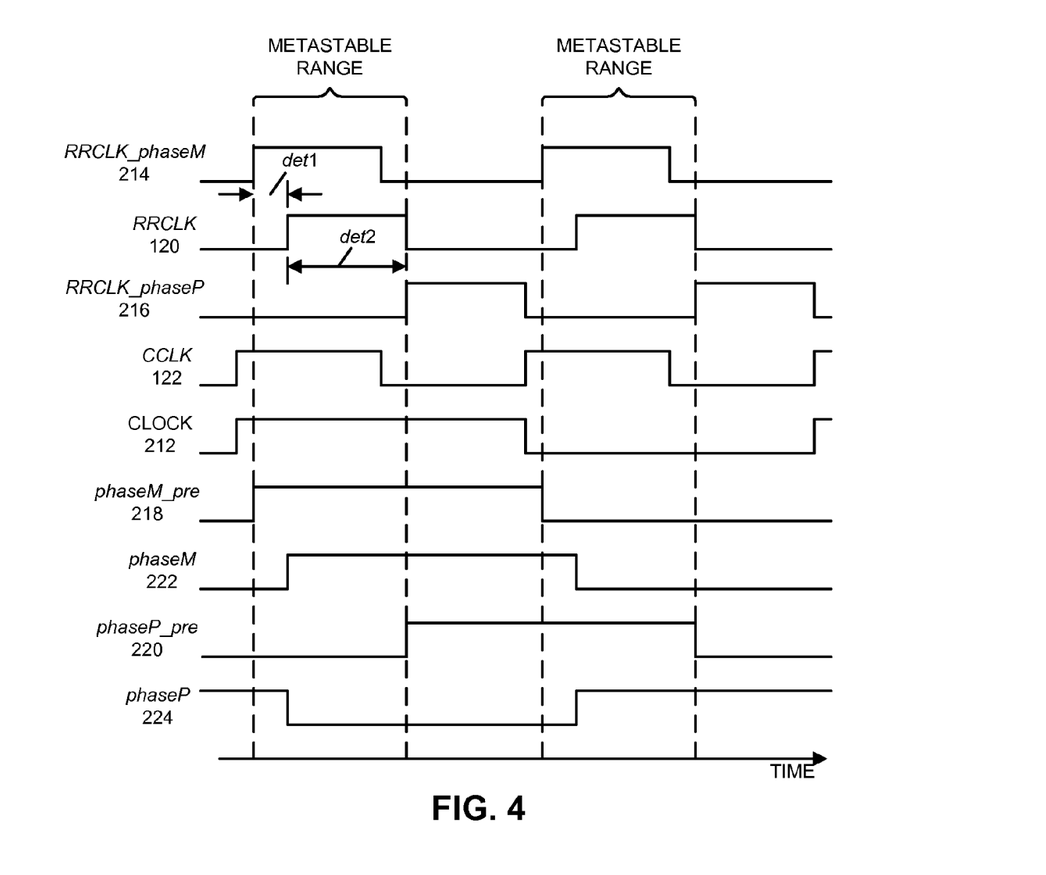
FIG. 4 is a timing diagram illustrating signals in the phase-detection circuit of FIGS. 1 and 2 in accordance with an embodiment of the present disclosure.

As shown in FIG. 3, RRCLK_phaseM 214 may be generated using delay circuit 300 in which the multiplexer delay selection is controlled by a counter (not shown) that counts when FIFO buffer 124 (FIG. 1) is metastable, and provides the phase-select signal accordingly. Note that the phase of RRCLK_phaseM 214 is det1 ahead of RRCLK 120, which in turn is det2 ahead of RRCLK_phaseP 216 (det1 and det2 are illustrated in FIG. 4 below). Consequently, delay circuit 300 can also be used to generate RRCLK_phaseP 216.

However, note that the use of delay-based control may change the timing relation for the serial-to-parallel conversion (for example, if the parallel clock are moved around by the inserted delays). As a consequence, one more pipeline stage may be added in the parallel clock domain to isolate this problem in the parallel clock domain (because the parallel clock is running at lower speed). Then, adding identical delays in RRCLK_phaseM 214, RRCLK_phaseP 216 (FIG. 2) and RRCLK 120 may ensure that the relation between the RRCLK 120 and CCLK 122 (FIGS. 1 and 2) is adjusted by the aforementioned controls. Note that the delay options may need to be controlled to fit in the timing budget between the new inserted pipeline stage and the pipeline clocked by RRCLK 120. For example, the phase of a clock gating a FIFO stage may be adjusted to obtain a desired relation between the RRCLK 120 and CCLK 122 (FIGS. 1 and 2).

Alternatively, if the phase-shift information (such as det1 and det2) is known in unit interval, the multiplexer inputs can be replaced by phase-shifted clock sources. Note that similar techniques may be used to implement phase-adjustment circuit 130 (FIG. 1). This will eliminate the additional stage in preceding option described above.

For example, RRCLK_phaseM 214, RRCLK_phaseP 216 (FIG. 2) and RRCLK 120 can be changed together in unit-interval (UI) steps. In an exemplary embodiment, RRCLK 120 may be a 16 UI clock and changing RRCLK 120 by 4 UI may be smooth enough not to cause any disturbance in the timing path. Note that creating a phase-shifted clock can be implemented by stopping the clock divider (counter) by 4 UI.

In an exemplary embodiment, serial-to-parallel conversion occurs in the serial-interface design. Moreover, high-speed serial data may run at a 4 UI clock, and it may need to be slowed down to run at a 16 UI clock domain. Typically, there is a shifter running at the 4 UI clock, which creates 16-bit data and which changes every 4 UI clock. This 16-bit data may be recaptured by the 16 UI clock every 16 UI. The relationship between the 4 UI clock and the 16 UI clock timing may be a 4 UI clock path. Note that, if the edge of the 16 UI clock moves by 4 UI, it may not cause any difficulty in the timing. As a consequence, if the detection circuit described above can trigger the phase shifting of 4 UI for the 16 UI clock, the phase realignment between RRCLK 120 and CCLK 122 (FIGS. 1 and 2) can be archived without adding any additional stage and without causing any additional timing trouble.

Referring back to FIG. 2, flip-flops 212-1 and 212-2 may be coupled to optional flip-flops 212-3 and 212-4, which are gated by RRCLK_phaseM 214 and RRCLK_phaseP 216, and which may be included for timing-closure purposes (i.e., stability).

Additionally, phase-detection circuit 128 may include: a flip-flop 212-5 coupled to flip-flop 212-1 (or optional flip-flop 212-3) and gated by RRCLK 120, where flip-flop 212-5 samples phaseM_pre 218 and outputs phaseM 222, and a flip-flop 212-6 coupled to flip-flop 212-2 (or optional flip-flop 212-4) and gated by RRCLK 120, where flip-flop 212-6 samples phaseP_pre 220 and outputs phaseP 224.

As shown in FIG. 4, which presents a timing diagram illustrating signals in phase-detection circuit 128 (FIGS. 1 and 2), the determined phase relationship may occur when phaseM 222 is opposite to phaseP 224. Note that RRCLK_phaseM 214 may be det1 earlier than RRCLK 120 and RRCLK_phaseP 216 may be det2 later than RRCLK 120. The clock-adjustment technique illustrated in FIG. 4 modifies the phase of RRCLK 120 (along with RRCLK_phaseM 214 and RRCLK_phaseP 216) so that CCLK 122 does not have a transition (such as from a logical '0' to a logical '1') between RRCLK_phaseM 214 and RRCLK_phaseP 216 (i.e., so that phaseM 222 is different from phaseP 224).

As noted previously, the phase of RRCLK 120 can be adjusted by adding a delay in the datapath in clock domain 110. For example, in a SerDes circuit 114 in FIG. 1, there are components that align the serial data to the word boundary. By adding a delay in the serial datapath, the word-boundary alignment logic can adjust the phase of RRCLK 120 to match the new data delays. The net result is that the RRCLK 120 is adjusted.

Figure 5:
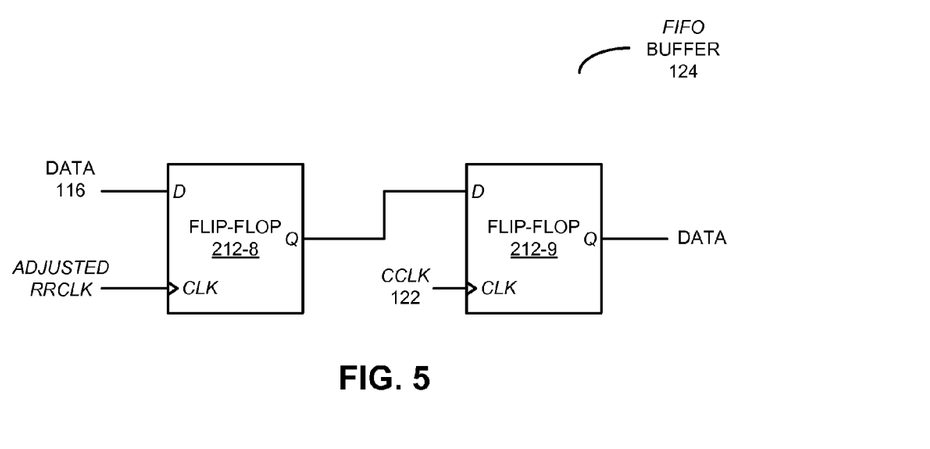
FIG. 5 is a drawing illustrating a first-in first-out (FIFO) buffer in the system of FIG. 1 in accordance with an embodiment of the present disclosure.

FIG. 5 presents a drawing illustrating an exemplary embodiment of FIFO buffer 124, which includes flip-flops 212.

System 100 (FIG. 1) may be implemented on one or more integrated circuits, such as a transmitter integrated circuit and a receiver integrated circuit. Moreover, the one or more integrated circuits may be used in a variety of applications, including: VLSI circuits, communication systems, storage area networks, data centers, networks (such as local area networks), memory components (such as those that include a high I/O count), electronic devices, memory systems, and/or computer systems (such as multiple-core processor computer systems, computer systems that include components that communicate via capacitive proximity communication, computer systems that include components that communicate via optical proximity communication, etc.). Note that the computer systems may include, but are not limited to: a server, a laptop computer, a communication device or system, a personal computer, a work station, a mainframe computer, a blade, an enterprise computer, a data center, a portable-computing device, a tablet computer, a supercomputer, a network-attached-storage (NAS) system, a storage-area-network (SAN) system, and/or another electronic computing device. Moreover, note that a given computer system may be at one location or may be distributed over multiple, geographically dispersed locations.

System 100 (FIG. 1), phase-detection circuit 128 (FIGS. 1 and 2), delay circuit 300 (FIG. 3) and/or FIFO buffer 124 (FIGS. 1 and 5) may include fewer components or additional components. Although these embodiments are illustrated as having a number of discrete items, these circuits and devices are intended to be functional descriptions of the various features that may be present rather than structural schematics of the embodiments described herein. Consequently, in these embodiments two or more components may be combined into a single component, and/or a position of one or more components may be changed. Furthermore, note that circuits in these embodiments may be implemented using PMOS and/or NMOS, and signals may include digital signals that have approximately discrete values and/or analog signals that have continuous values.

Figure 6:
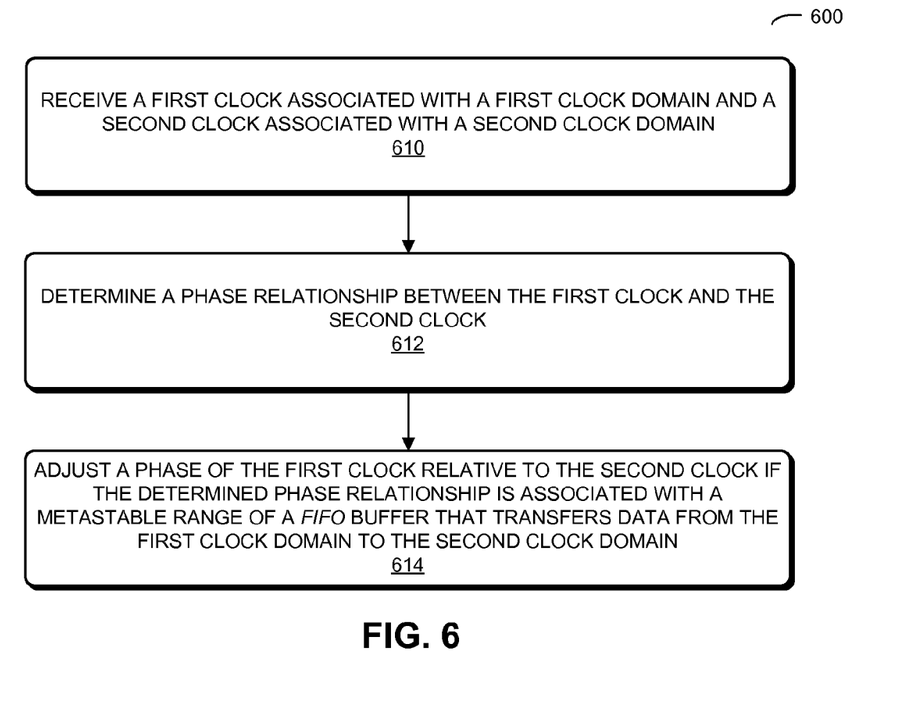
FIG. 6 is a flow chart illustrating a method for adjusting a phase of a first clock relative to a second clock in the system of FIG. 1 in accordance with an embodiment of the present disclosure.

We describe embodiments of the method. FIG. 6 presents a flow chart illustrating a method 600 for adjusting a phase of a first clock relative to a second clock, which may be performed by clock-adjustment circuit 126 (FIG. 1). During this method, a phase-detection circuit receives a first clock associated with a first clock domain and a second clock associated with a second clock domain (operation 610). Then, a phase-detection circuit determines a phase relationship between the first clock and the second clock (operation 612). Next, a phase-adjustment circuit adjusts a phase of the first clock relative to the second clock if the determined phase relationship is associated with a metastable range of a FIFO buffer that transfers data from the first clock domain to the second clock domain (operation 614), thereby enabling low latency in FIFO buffer.

In some embodiments of method 600, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A clock-adjustment circuit, comprising:
a first clock signal associated with a first clock domain;
a second clock signal associated with a second clock domain;
a phase-detection circuit configured to receive the first clock signal and the second clock and to determine a phase relationship between the first clock signal and the second clock signal; and
a phase-adjustment circuit configured to adjust a phase of the first clock signal relative to the second clock signal when the determined phase relationship is associated with a metastable range of a first-in first-out (FIFO) buffer that stores data which is being transferred from the first clock domain to the second clock domain, thereby reducing latency associated with the FIFO buffer, wherein the FIFO buffer comprises at least two flip-flops, wherein at least one flip-flop is clocked by the adjusted first clock signal and at least one flip-flop is clocked by the second clock signal.

2. The clock-adjustment circuit of claim 1, wherein the first clock signal is recovered from received data.

3. The clock-adjustment circuit of claim 1, wherein the second clock signal is a core clock signal associated with a processor.

4. The clock-adjustment circuit of claim 1, wherein the first clock signal and the second clock signal have the same fundamental frequency.

5. The clock-adjustment circuit of claim 1, wherein the clock-adjustment circuit converts a random phase of the first clock signal into a deterministic phase relative to the second clock signal.

6. The clock-adjustment circuit of claim 5, wherein the deterministic phase is less than one clock period.

7. The clock-adjustment circuit of claim 1, wherein adjusting the phase of the first clock signal involves adding a delay.

8. The clock-adjustment circuit of claim 1, wherein the phase-detection circuit includes a divide-by-2 circuit that outputs a third clock signal having a frequency equal to that of the second clock signal divided by 2; and
wherein the phase-detection circuit includes:
a first flip-flop, gated by a first version of the first clock signal having a first phase, configured to sample the third clock signal and to output one of a first pair of phase signals; and
a second flip-flop, gated by a second version of the first clock signal having a second phase, configured to sample the third clock signal and to output another of the first pair of phase signals; and
wherein a phase difference between the first version of the first clock signal and the second version of the first clock signal corresponds to the metastable range.

9. The clock-adjustment circuit of claim 8, wherein the phase-detection circuit further includes:
a third flip-flop coupled to the first flip-flop and gated by the first clock signal, wherein the third flip-flop is configured to sample the one of the first pair of phase signals and to output one of a second pair of phase signals; and
a fourth flip-flop coupled to the second flip-flop and gated by the first clock signal, wherein the fourth flip-flop is configured to sample the other of the first pair of phase signals and to output another of the second pair of phase signals.

10. The clock-adjustment circuit of claim 9, wherein the determined phase relationship occurs when the one of the second pair of phase signals is opposite to the other of the second pair of phase signals.

11. A system, comprising a clock-adjustment circuit, wherein the clock-adjustment circuit includes:
a first clock signal associated with a first clock domain;
a second clock signal associated with a second clock domain;
a phase-detection circuit configured to receive the first clock signal and the second clock signal and to determine a phase relationship between the first clock signal and the second clock signal; and
a phase-adjustment circuit configured to adjust a phase of the first clock signal relative to the second clock signal when the determined phase relationship is associated with a metastable range of a first-in first-out (FIFO) buffer that stores data which is being transferred from the first clock domain to the second clock domain, thereby reducing latency associated with the FIFO buffer, wherein the FIFO buffer comprises at least two flip-flops, wherein at least one flip-flop is clocked by the adjusted first clock signal and at least one flip-flop is clocked by the second clock signal.

12. The system of claim 11, wherein the first clock signal is recovered from received data; and
wherein the second clock signal is a core clock signal associated with a processor.

13. The system of claim 11, wherein the first clock signal and the second clock signal have the same fundamental frequency.

14. The system of claim 11, wherein the clock-adjustment circuit converts a random phase of the first clock signal into a deterministic phase relative to the second clock signal.

15. The system of claim 14, wherein the deterministic phase is less than one clock period.

16. The system of claim 11, wherein adjusting the phase of the first clock signal involves adding a delay.

17. The system of claim 11, wherein the phase-detection circuit includes a divide-by-2 circuit that outputs a third clock signal having a frequency equal to that of the second clock signal divided by 2; and
wherein the phase-detection circuit includes:
a first flip-flop, gated by a first version of the first clock signal having a first phase, configured to sample the third clock signal and to output one of a first pair of phase signals; and
a second flip-flop, gated by a second version of the first clock signal having a second phase, configured to sample the third clock signal and to output another of the first pair of phase signals; and
wherein a phase difference between the first version of the first clock signal and the second version of the first clock signal corresponds to the metastable range.

18. The system of claim 17, wherein the phase-detection circuit further includes:
a third flip-flop coupled to the first flip-flop and gated by the first clock signal, wherein the third flip-flop is configured to sample the one of the first pair of phase signals and to output one of a second pair of phase signals; and
a fourth flip-flop coupled to the second flip-flop and gated by the first clock signal, wherein the fourth flip-flop is configured to sample the other of the first pair of phase signals and to output another of the second pair of phase signals.

19. The system of claim 18, wherein the determined phase relationship occurs when the one of the second pair of phase signals is opposite to the other of the second pair of phase signals.

20. A method for adjusting a phase of a first clock signal relative to a second clock signal, wherein the method comprises:
receiving the first clock signal associated with a first clock domain and the second clock signal associated with a second clock domain;
determining, using a phase-detection circuit, a phase relationship between the first clock signal and the second clock signal; and
adjusting, using a phase-adjustment circuit, the phase of the first clock signal relative to the second clock signal when the determined phase relationship is associated with a metastable range of a first-in first-out (FIFO) buffer that stored data which is being transferred from the first clock domain to the second clock domain, thereby reducing latency associated with the FIFO buffer, wherein the FIFO buffer comprises at least two flip-flops, wherein at least one flip-flop is clocked by the adjusted first clock signal and at least one flip-flop is clocked by the second clock signal.

* * * * *

UNITED STATES PATENT AND TRADEMARK OFFICE
CERTIFICATE OF CORRECTION

| | | |
|---|---|---|
| PATENT NO. | : 8,958,517 B2 | Page 1 of 1 |
| APPLICATION NO. | : 13/341119 | |
| DATED | : February 17, 2015 | |
| INVENTOR(S) | : Jianghui Su | |

It is certified that error appears in the above-identified patent and that said Letters Patent is hereby corrected as shown below:

On the title page, item 74, Attorney, Agent, or Firm, insert the name -- Steven E. Stupp -- immediately following the firm name "Park, Vaughan, Fleming & Dowler LLP"

Signed and Sealed this
Nineteenth Day of April, 2016

Michelle K. Lee
*Director of the United States Patent and Trademark Office*